(12) United States Patent
Wang et al.

(10) Patent No.: US 10,793,674 B2
(45) Date of Patent: Oct. 6, 2020

(54) PREPARATION METHOD OF ELECTROCONDUCTIVE POLYIMIDE AND DISPLAY PANEL

(71) Applicant: Shenzhen China Star Optoelectronics Technology Co., Ltd., Shenzhen (CN)

(72) Inventors: Haijun Wang, Shenzhen (CN); Xia Zhang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 26 days.

(21) Appl. No.: 16/109,791

(22) Filed: Aug. 23, 2018

(65) Prior Publication Data
US 2019/0218343 A1  Jul. 18, 2019

Related U.S. Application Data

(63) Continuation of application No. PCT/CN2018/087202, filed on May 17, 2018.

(30) Foreign Application Priority Data

Jan. 18, 2018  (CN) .......................... 2018 1 0051545

(51) Int. Cl.
| | |
|---|---|
| *C08G 73/10* | (2006.01) |
| *H01B 1/24* | (2006.01) |
| *C08F 2/44* | (2006.01) |
| *C08K 3/04* | (2006.01) |
| *B82Y 30/00* | (2011.01) |

(52) U.S. Cl.
CPC ............ *C08G 73/1032* (2013.01); *C08F 2/44* (2013.01); *C08K 3/041* (2017.05); *H01B 1/24* (2013.01); *B82Y 30/00* (2013.01); *C08K 2201/001* (2013.01); *C08K 2201/003* (2013.01); *C08K 2201/011* (2013.01)

(58) Field of Classification Search
CPC ........... D01D 5/06; C08G 73/10; C08L 79/08; G03F 7/0757
USPC .......................................... 252/511; 257/632
See application file for complete search history.

(56) References Cited

U.S. PATENT DOCUMENTS

2015/0344627 A1* 12/2015 Mizori ................. G03F 7/0757
                                                                 257/632

FOREIGN PATENT DOCUMENTS

| CN | 101187078 A | * | 5/2008 | ............... D01D 5/06 |
| CN | 103305961 A | * | 9/2013 | ............. C08G 73/10 |
| CN | 105461922 A |   | 4/2016 | |
| CN | 107540836 A | * | 1/2018 | ............. C08G 73/10 |
| JP | 2012-167186 A | * | 9/2012 | ............. C08L 79/08 |

(Continued)

*Primary Examiner* — Khanh T Nguyen

(57) ABSTRACT

The present disclosure provides a preparation method of the electroconductive polyimide and a display panel. The preparation method may include: providing aminated carbon nanotubes; and mixing the aminated carbon nanotubes with diamine and dianhydride in a predetermined reaction condition to form a mixture, such that the aminated carbon nanotubes react with the diamine and the dianhydride to generate the electroconductive polyimide. According to the above method, the electroconductive polyimide can be prepared through the reaction between the aminated carbon nanotubes, the diamine, and the dianhydride.

19 Claims, 2 Drawing Sheets

--- providing aminated carbon nanotubes; and — S11 mixing the aminated carbon nanotubes with diamine and dianhydride in a predetermined reaction condition to form a mixture, such that the aminated carbon nanotubes react with the diamine and the dianhydride to generate the electroconductive polyimide — S12

(56) References Cited

FOREIGN PATENT DOCUMENTS

JP          2012167186 A     9/2012

* cited by examiner

PREPARATION METHOD OF ELECTROCONDUCTIVE POLYIMIDE AND DISPLAY PANEL

CROSS-REFERENCE TO RELATED APPLICATIONS

The present application is a continuation-application of International (PCT) Patent Application No. PCT/CN20181087202 filed on May 17, 2018, which claims foreign priority of Chinese Patent Application No. 201810051545.3, filed on Jan. 18, 2018 in the State Intellectual Property Office of China, the entire contents of which are hereby incorporated by reference.

TECHNICAL FIELD

The present disclosure generally relates to manufacturing of liquid crystal display panel, and in particular to a preparation method of electroconductive polyimide, and a display panel.

BACKGROUND

As the technology of the thin film transistor-liquid crystal display (TFT-LCD) continues to improve, users can enjoy a nice visual effect from the TFT-LCD. Meanwhile, the material and process of the TFT-LCD is getting better, and the cost of the TFT-LCD tends to reduce, which tremendously promote to reducing excess capacity of the panel and the consumer's buying demand. However, there are some limitations out there. For instance, indium, which is a necessary element in indium tin oxide (ITO) of the TFT-LCD, is a rare element and non-renewable, and thus the price thereof tends to rise predictably, which has an affect on the price of the display panel.

Currently, other electroconductive materials such as graphene, silver nanowire and electroconductive polymer have been adopted to replace ITO to reduce the cost. The electroconductive materials above could be formed to be a conducting layer on a color filter substrate (CF) or an array substrate by transfer, coating, or chemical vapor deposition (CVD) and so on. However, it's difficult to prepare the conducting layer on a large-scale with the electroconductive materials above. Furthermore, uniformity heat stability, and chemical stability of the electroconductive materials are poor. Additionally, it can just save material cost to prepare the conducting layer with the electroconductive materials above, the craft process cannot be simplified, and therefore the production costs are still high.

DETAILED DESCRIPTION

The technical solutions in the embodiments of the present disclosure will be clearly and completely described in connection with the drawings in the embodiments of the present disclosure. Obviously, the described embodiments are merely parts of the embodiments of the present disclosure, not all embodiments. Based on the embodiments in the present disclosure, all other embodiments can be obtained by those skilled in the art without making any creative work are within the scope of the protection of the present disclosure.

Figure 1:
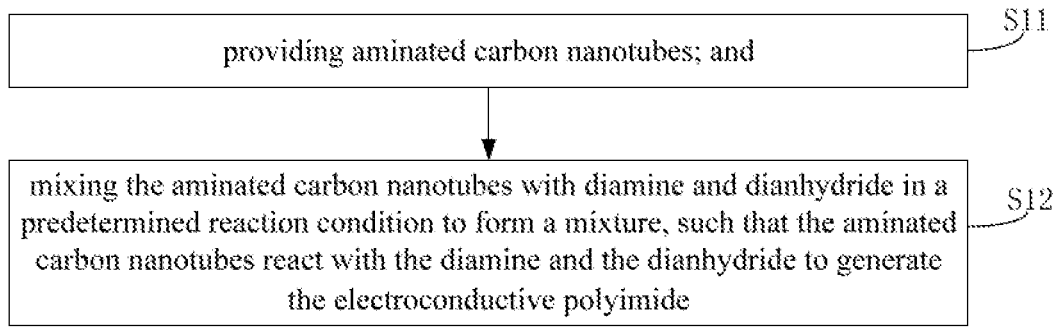
FIG. 1 is a flowchart illustrating a preparation method of electroconductive polyimide according to a first embodiment of the present disclosure.

Please refer to the FIG. 1, a preparation method of electroconductive polyimide according to a first embodiment of the present disclosure is depicted. The preparation method of this embodiment may include:

S11, providing aminated carbon nanotubes.

As one-dimensional nano materials, the carbon nanotubes may have advantages of light weight and perfect-connected hexagonal form. The carbon nanotubes may further have many abnormal mechanical properties, electrical performances, and chemical properties. As a result, the carbon nanotubes may be widely applied in many fields. The carbon nanotubes may include multiwalled carbon nanotube and single-walled carbon nanotube. Aminating the carbon nanotubes is one of the common preparation methods used on the carbon nanotubes. There may be many ways to obtain the aminated carbon nanotubes. For example, a mixed acid can be used to have the carbon nanotubes been with carboxyl, and amine compound can be further used to aminate the carbon nanotubes with the carboxyl.

S12, mixing the aminated carbon nanotubes with diamine and dianhydride in a predetermined reaction condition to form a mixture, such that the aminated carbon nanotubes react with the diamine and the dianhydride to generate the electroconductive polyimide.

Optionally, the block of S12 may further include: mixing the aminated carbon nanotubes with diamine and dianhydride in a predetermined mass ratio to form a mixture at a first reaction temperature and performing a reflux condensation on vapors of the mixture for a first time, such that the aminated carbon nanotubes react with the diamine and the dianhydride to generate the electroconductive polyimide with alignment.

The electroconductive polyimide formed above can replace the ITO to prepare the electroconductive layer of the substrate. The predetermined mass ratio may include the mass fraction of the aminated carbon nanotubes in the mixture and the mass ratio of the diamine and the dianhydride and so on. Specifically, the mass fraction of the aminated carbon nanotubes in the mixture may be 1%-10%, or 1%-5%, for example, it may be 1%, 3%, and 5% and so on. The mass ratio of the diamine and the dianhydride may be any one in the range from 1:1 to 1:10, such as 1:1, 1:5, 1:10. In a concrete embodiment, the mixture may include 10 parts by mass of the aminated carbon nanotubes, 95 parts by mass of the diamine, and 95 parts by mass of the dianhydride. The first reaction temperature may be 220° C.-250° C., such as 220° C., 240° C., 250° C., and the first time may be 0.5 h-100 h, such as 0.5 h, 50 h, and 100 h, and there is no limitation it.

The polyimide with alignment generated in the reaction above can be used to prepare an alignment layer of the substrate. In this embodiment, the polyimide generated may be both electroconductive and with alignment, thus the alignment layer and the electroconductive layer of the substrate can be prepared simultaneously. In other words, during the specific processes, the alignment layer and the electroconductive layer may be prepared in one process, which can simplify the process and save the cost.

In the embodiment above, under the predetermined reaction conditions, the mixture of the aminated carbon nanotubes, the diamine, and the dianhydride can react to form the electroconductive polyimide with alignment which may be respectively used to prepare the electroconductive layer and the alignment layer of the substrate, which can save the cost and simplify the process of preparing the substrate.

Figure 2:
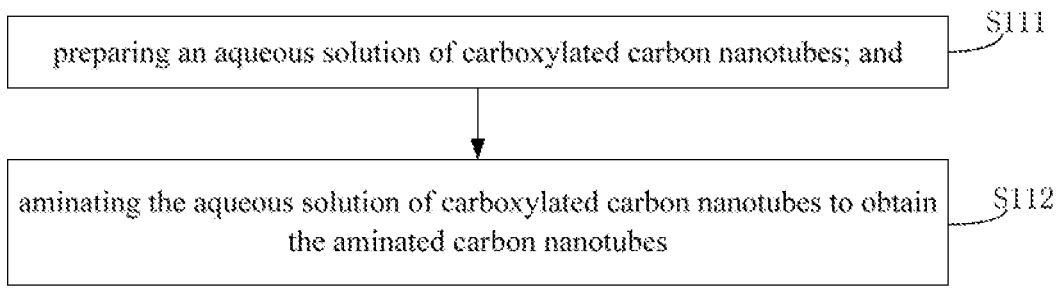
FIG. 2 is a flowchart illustrating a preparation method of electroconductive polyimide according to a second embodiment of the present disclosure.

Please refer to FIG. 2, a preparation method of electroconductive polyimide according to a second embodiment of the present disclosure is depicted. This embodiment is the flow of the block of the S11 in the FIG. 1, the method may include:

S111, preparing an aqueous solution of carboxylated carbon nanotubes.

Firstly the carbon nanotubes may be carboxylated and then the carboxylated carbon nanotubes may be dissolved in water. For example, strong mixed acid may be used to acidify the carbon nanotubes to contain carboxyl. Specifically, a reflux condensation may be performed on a mixture of the carbon nanotubes, nitric acid and sulfuric acid, through which the carbon nanotubes can be carboxylated to contain the carboxyl. And then methods such as centrifugation and freeze drying may be adopted to obtain carboxylated carbon nanotubes powder. Finally, the carboxylated carbon nanotubes powder may be dissolved into distilled water with ultrasonic or stilling to obtain the aqueous solution of carboxylated carbon nanotubes.

S112, aminating the aqueous solution of carboxylated carbon nanotubes to obtain the aminated carbon nanotubes.

At first, thionyl chloride with a reasonable mass ratio may be added into the aqueous solution of carboxylated carbon nanotubes to form a mixture, then a reflux condensation may be performed on the mixture of the aqueous solution of carboxylated carbon nanotubes and the thienyl chloride to acyl chloridize the carboxylated carbon nanotubes. Then filter the aqueous solution of carboxylated carbon nanotubes after being performed the acylating chlorination treatment off with suction to obtain acyl chloridized carbon nanotubes. Subsequently, polyamine with a reasonable mass ratio may be added into the acyl chloridized carbon nanotubes, such that the aminating modification of the carbon nanotubes can be accomplished to obtain the aminated carbon nanotubes.

In the present embodiment, the aminated carbon nanotubes may be obtained by process of carboxylating, acylating chlorinating and aminating.

Figure 3:
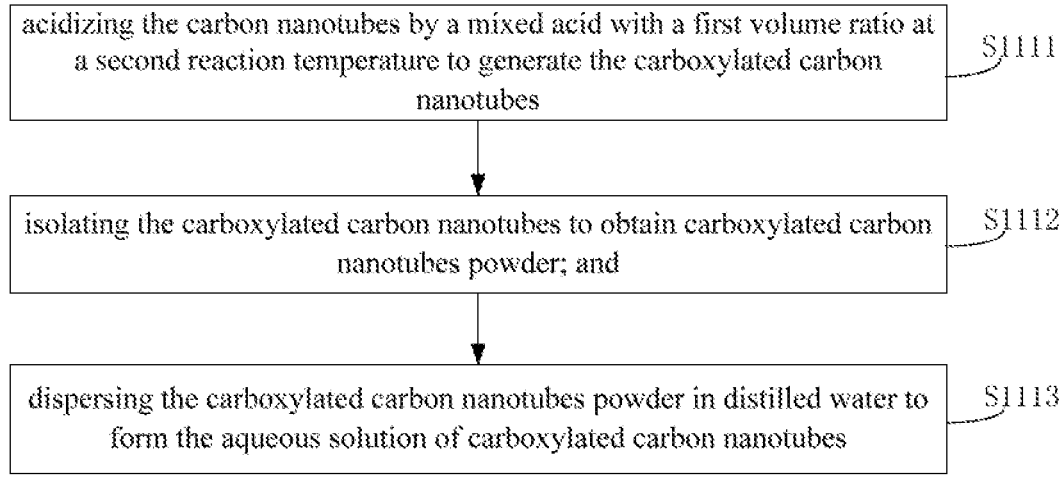
FIG. 3 is a flowchart illustrating a preparation method of electroconductive polyimide according to a third embodiment of the present disclosure.

Please refer to FIG. 3, a preparation method of electroconductive polyimide according to a third embodiment of the present disclosure is depicted. And this embodiment is the flow of the block of the S111 in the FIG. 2, the method may include:

S1111, acidizing the carbon nanotubes by a mixed acid with a first volume ratio at a second reaction temperature to generate the carboxylated carbon nanotubes.

The carbon nanotubes are well applied in many fields, and have many abnormal mechanical properties, electrical performances, and chemical properties. In one specific embodiment, the diameter of the carbon nanotubes may be 1 nm-5 nm, such as 1 nm, 3 nm, and 5 nm. And the length may be 1 um-5 um, such as 1 um, 3 um, and 5 um. In this embodiment, the block of acidizing the carbon nanotubes by a mixed acid with a first volume ratio at a second reaction temperature may be performing a reflux condensation on a mixture of the carbon nanotubes and a mixed acid consisting of the nitric acid and sulfuric acid. The volume ratio of the nitric acid and sulfuric acid may be 1:10-1:3, such as 1:10, 1:5, and 1:3. And the second reaction temperature may be 180° C.-200° C., such as 180° C., 190° C., 200° C., and there is no limitation it. Certainly, in other embodiments, the carbon nanotubes can be carboxylated by other methods of acidification.

S1112, isolating the carboxylated carbon nanotubes to obtain carboxylated carbon nanotubes powder.

After carboxylating the carbon nanotubes, a mixed liquid of the carboxylated carbon nanotubes and other substance can be obtained. Thus, isolation and purification may be needed to obtain the carboxylated carbon nanotubes powder. For example, centrifugal separation can be adopted to separate the carboxylated carbon nanotubes. In one embodiment, the rotational speed of the centrifugal separation equipment may be greater than 4000 rpm, such as 5000 rpm, 6000 rpm, and the time of centrifugation may be greater than 30 min, such as 32 min, 40 min. After the centrifugal separation of the mixed liquid of the carboxylated carbon nanotubes and other substance, a freeze-drying treatment may be performed on the product of the centrifugal separation to obtain the carboxylated carbon nanotube powder.

S1113, dispersing the carboxylated carbon nanotube powder in distilled water to form the aqueous solution of carboxylated carbon nanotubes.

Subsequent chemical operations may require an aqueous solution of carboxylated carbon nanotubes, therefore, it is necessary to dissolve the carboxylated carbon nanotube powder into an aqueous solution. Specifically, the carboxylated carbon nanotube powder with a reasonable mass ratio may be dispersed in distilled water by ultrasonic or stirring to prepare the aqueous solution of carboxylated carbon nanotubes.

In this embodiment, the aqueous solution of carboxylated carbon nanotubes may be obtained by carboxylating the carbon nanotubes by mixing the carbon nanotubes and the mixed acid, and then centrifugal separating to obtain the carboxylated carbon nanotube powder, and then the aqueous solution of carboxylated carbon nanotubes can be prepared using the powder above.

Figure 4:
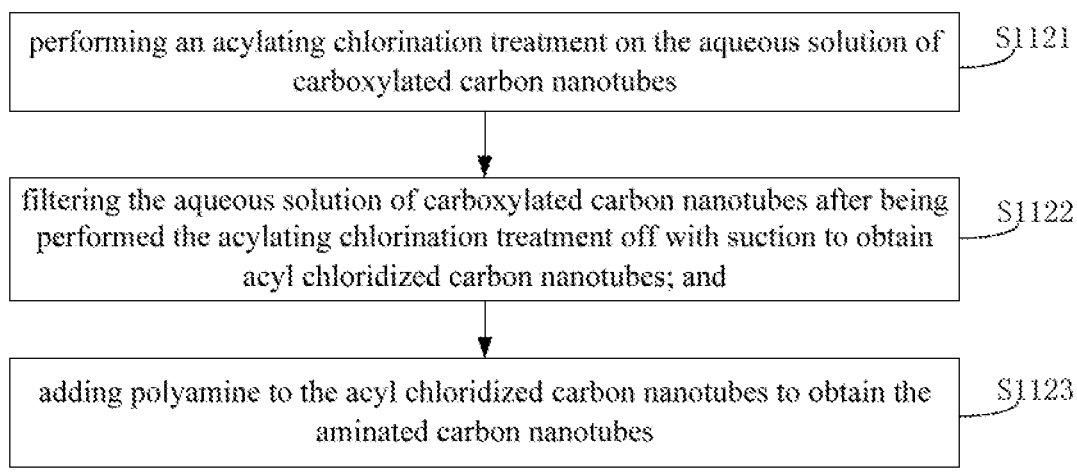
FIG. 4 is a flowchart illustrating a preparation method of electroconductive polyimide according to a fourth embodiment of the present disclosure.

Please refer to FIG. 4, a preparation method of electroconductive polyimide according to a forth embodiment of the present disclosure is depicted. And this embodiment is the flow of the block of the S112 in the FIG. 2, the method may include:

S1121, performing an acylating chlorination treatment on the aqueous solution of carboxylated carbon nanotubes.

The acyl chlorinated carbon nanotubes can be obtained by performing the acylating chlorination treatment on the aqueous solution of the carboxylated carbon nanotubes by the addition of the thionyl chloride. The mass ratio of the carboxylated carbon nanotubes and the thionyl chloride may be 1:1-1:10, such as 1:1, 1:5, and 1:10. And during the acylating chlorination treatment, the reflux condensation may be performed on the aqueous solution of carboxylated carbon nanotubes after the addition of the thionyl chloride at a reaction temperature of 180° C.-200° C. The reaction temperature may be 180° C., 190° C., 200° C. and so on. The time of the acylating chlorination treatment may be 1 h-50 h, such as 1 h, 25 h, 50 h.

S1122, filtering the aqueous solution of carboxylated carbon nanotubes after being performed the acylating chlorination treatment off with suction to obtain acyl chloridized carbon nanotubes.

Because the acyl chloridized carbon nanotubes is in a solution state, a solid-liquid separation such as the suction filtration may be performed to extract the acyl chloridized carbon nanotubes from the acyl chloridized carbon nanotubes.

S1123, adding polyamine to the acyl chloridized carbon nanotubes to obtain the animated carbon nanotubes.

In this embodiment, the polyamine may be added into the acyl chloridized carbon nanotubes to aminate the acyl chloridized carbon nanotubes to obtain the aminated carbon nanotubes. The common polyamine may include methylene diphenylamine and 1, 3-propanediolbis (4, 4'-aminobenzoate), and there is no limitation on it. The polyamine may be one single kind of polyamine or a combination of several kinds of polyamine. The mass ratio of the acyl chloridized carbon nanotubes and the polyamine may be 1:1-1:50, such as 1:1, 1:25, and 1:50.

In this embodiment, the carboxylated carbon nanotubes may be acyl chloridized by adding the thionyl chloride into the aqueous solution of carboxylated carbon nanotubes, and then the aminated carbon nanotubes can be obtained by adding polyamine to the acyl chloridized carbon nanotubes.

Specially, the embodiments in FIG. 2 to FIG. 4 just provide several amination methods of the carbon nanotubes. In other embodiments, other methods may be adopted to aminating the carbon nanotubes, and there is no limitation on it.

Figure 5:
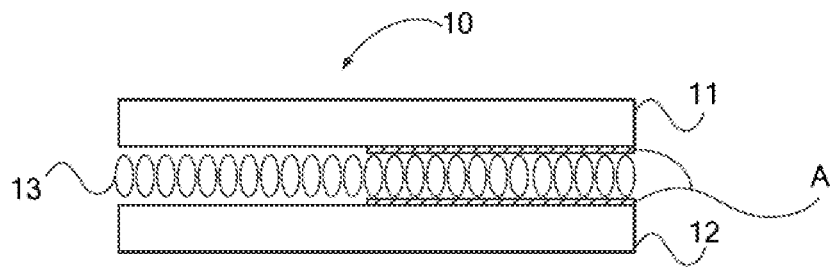
FIG. 5 a schematic structural view illustrating a display panel according to an embodiment of the present disclosure.

Referring to FIG. 5, a display panel according to an embodiment of the present disclosure is depicted, a display panel 10 may include an upper panel 11 and a lower panel 12, and a liquid crystal layer 13 sandwiched between the upper panel 11 and the lower panel 12. The upper panel 11 may be a color filter substrate, and the lower panel 12 may be an array substrate. Electroconductive polyimide A may be formed on both the upper panel 11 and the lower panel 12. The preparation methods of the electroconductive polyimide A is described in above embodiments, which is not recited herein.

In the above embodiments, the easy-to-get carbon nanotubes may be acidified to obtain the carboxylated carbon nanotubes firstly, and then the carboxylated carbon nanotubes may be acyl chloridized. Furthermore, the acyl chloridized carbon nanotubes may be aminated by the reaction between polyamine and the acyl chloridized carbon nanotubes. At last, the aminated carbon nanotubes may be mixed with diamine and dianhydride together to react to generate the electroconductive polyimide which may be a substitute material of the ITO.

From the above, the present disclosure providing a preparation method of electroconductive polyimide and a display panel can reduce the process cost through replacing the indium tin oxide layer of the substrate by the electroconductive polyimide formed by the reaction of the aminated carbon nanotubes with diamine, and dianhydride.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A preparation method of electroconductive polyimide, comprising:
providing aminated carbon nanotubes, wherein diameters of the carbon nanotubes range from 1 nm to 5 nm; and
mixing the aminated carbon nanotubes with diamine and dianhydride in a predetermined mass ratio to form a mixture at a first reaction temperature and performing a reflux condensation on vapors of the mixture for a first time, such that the aminated carbon nanotubes react with the diamine and the dianhydride to generate the electroconductive polyimide with alignment;
wherein the first reaction temperature is 220° C.-250° C.

2. The method of claim 1, wherein a mass fraction of the aminated carbon nanotubes in the mixture is 1%-5%, the mass ratio of the diamine and the dianhydride is 1:1-1:10.

3. The method of claim 1, wherein the first time is 0.5 h-100 h.

4. The method of claim 1, wherein the providing aminated carbon nanotubes further comprises:
preparing an aqueous solution of carboxylated carbon nanotubes; and
aminating the aqueous solution of carboxylated carbon nanotubes to obtain the aminated carbon nanotubes.

5. The method of claim 4, wherein the preparing an aqueous solution of carboxylated carbon nanotubes further comprises:
acidizing the carbon nanotubes by a mixed acid with a first volume ratio at a second reaction temperature to generate the carboxylated carbon nanotubes;
isolating the carboxylated carbon nanotubes to obtain carboxylated carbon nanotubes powder; and
dispersing the carboxylated carbon nanotubes powder in distilled water to form the aqueous solution of carboxylated carbon nanotubes.

6. The method of claim 5, wherein the mixed acid comprise nitric acid and sulfuric acid, the first volume ratio is 3:1-10:1, and the second reaction temperature is 180° C.-250° C.

7. The method of claim 4, wherein the aminating the aqueous solution of carboxylated carbon nanotubes to obtain the aminated carbon nanotubes further comprises:
performing an acylating chlorination treatment on the aqueous solution of carboxylated carbon nanotubes;
filtering the aqueous solution of carboxylated carbon nanotubes after being performed the acylating chlorination treatment off with suction to obtain acyl chloridized carbon nanotubes; and
adding polyamine to the acyl chloridized carbon nanotubes to obtain the aminated carbon nanotubes.

8. The method of claim 7, the performing an acylating chlorination treatment on the aqueous solution of carboxylated carbon nanotubes further comprises:
performing a reflux condensation on the aqueous solution of carboxylated carbon nanotubes and thionyl chloride to abtain an acyl chloridized aqueous solution of the carboxylated carbon nanotubes.

9. The method of claim 8, wherein the reflux condensation performed on the aqueous solution of carboxylated carbon nanotubes and thionyl chloride at a reaction temperature of 180° C.-200° C., a mass ratio of the carboxylated carbon nanotubes and the thionyl chloride is 1:1-1:10.

10. A display panel, comprising an electroconductive film, wherein the electroconductive film comprises the electroconductive polyimide prepared by the preparation method of the claim 1.

11. A preparation method of electroconductive polyimide, the method comprising:
providing aminated carbon nanotubes; and
mixing the aminated carbon nanotubes with diamine and dianhydride in a predetermined mass ratio to form a mixture at a first reaction temperature and performing a reflux condensation on vapors of the mixture for a first time, such that the aminated carbon nanotubes react with the diamine and the dianhydride to generate the electroconductive polyimide with alignment;

wherein the first reaction temperature is 220° C.-250° C.

12. The method of claim 11, wherein a mass fraction of the aminated carbon nanotubes in the mixture is 1%-5%, the mass ratio of the diamine and the dianhydride is 1:1-1:10.

13. The method of claim 11, wherein the first time is 0.5 h-100 h.

14. The method of claim 11, wherein the providing aminated carbon nanotubes further comprises:
preparing an aqueous solution of carboxylated carbon nanotubes; and
aminating the aqueous solution of carboxylated carbon nanotubes to obtain the aminated carbon nanotubes.

15. The method of claim 14, wherein the preparing an aqueous solution of carboxylated carbon nanotubes further comprises:
acidizing the carbon nanotubes by a mixed acid with a first volume ratio at a second reaction temperature to generate the carboxylated carbon nanotubes;
isolating the carboxylated carbon nanotubes to obtain carboxylated carbon nanotubes powder; and
dispersing the carboxylated carbon nanotubes powder in distilled water to form the aqueous solution of carboxylated carbon nanotubes.

16. The method of claim 15, wherein the mixed acid comprise nitric acid and sulfuric acid, the first volume ratio is 3:1-10:1, and the second reaction temperature is 180° C.-250° C.

17. The method of claim 14, wherein the aminating the aqueous solution of carboxylated carbon nanotubes to obtain the aminated carbon nanotubes further comprises:
performing an acylating chlorination treatment on the aqueous solution of carboxylated carbon nanotubes;
filtering the aqueous solution of carboxylated carbon nanotubes after being performed the acylating chlorination treatment off with suction to obtain acyl chloridized carbon nanotubes;
adding polyamine to the acyl chloridized carbon nanotubes to obtain the aminated carbon nanotubes.

18. The method of claim 17, the performing an acylating chlorination treatment on the aqueous solution of carboxylated carbon nanotubes further comprises:
performing a reflux condensation on the aqueous solution of carboxylated carbon nanotubes and thionyl chloride to abtain an acyl chloridized aqueous solution of the carboxylated carbon nanotubes.

19. The method of claim 18, wherein the reflux condensation performed on the aqueous solution of carboxylated carbon nanotubes and thionyl chloride at a reaction temperature of 180° C.-200° C., a mass ratio of the carboxylated carbon nanotubes and the thionyl chloride is 1:1-1:10.

* * * * *